US010871984B2

(12) United States Patent
Pearson et al.

(10) Patent No.: US 10,871,984 B2
(45) Date of Patent: Dec. 22, 2020

(54) SECURE SERVICE HOSTED IN A VIRTUAL SECURITY ENVIRONMENT

(71) Applicant: Microsoft Technology Licensing, LLC, Redmond, WA (US)

(72) Inventors: Malcolm E. Pearson, Kirkland, WA (US); Tolga Acar, Sammamish, WA (US); Rahul Verma, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/386,842

(22) Filed: Apr. 17, 2019

(65) Prior Publication Data

US 2019/0243678 A1    Aug. 8, 2019

Related U.S. Application Data

(63) Continuation of application No. 15/333,573, filed on Oct. 25, 2016, now Pat. No. 10,310,885.

(51) Int. Cl.
| | |
|---|---|
| *G06F 9/455* | (2018.01) |
| *G06F 21/53* | (2013.01) |
| *G06F 21/60* | (2013.01) |
| *H04L 9/08* | (2006.01) |

(52) U.S. Cl.
CPC .......... *G06F 9/45558* (2013.01); *G06F 21/53* (2013.01); *G06F 21/602* (2013.01); *H04L 9/083* (2013.01); *H04L 9/0822* (2013.01); *G06F 2009/45587* (2013.01); *H04L 2463/041* (2013.01)

(58) Field of Classification Search
None
See application file for complete search history.

(56) References Cited

U.S. PATENT DOCUMENTS

| | | | |
|---|---|---|---|
| 7,260,224 B1* | 8/2007 | Ingle | H04L 63/062 380/279 |
| 2010/0211782 A1* | 8/2010 | Auradkar | H04L 9/083 713/168 |
| 2011/0150224 A1* | 6/2011 | Noh | H04L 9/0836 380/277 |
| 2012/0102220 A1* | 4/2012 | Hopmann | H04L 45/306 709/238 |

(Continued)

OTHER PUBLICATIONS

Zhou et al., "Achieving Secure Role-Based Access Control on Encrypted Data in Cloud Storage", IEEE Transactions on Information Forensics and Security, vol. 8, No. 12, Dec. 2013, pp. 1947-1960.*

(Continued)

*Primary Examiner* — Kenneth Tang
(74) *Attorney, Agent, or Firm* — Christopher J. Volkmann; Kelly, Holt & Christenson, PLLC

(57) ABSTRACT

An execution environment has a deployed virtual machine image. The virtual machine image provides a service that is identified by a role. The execution environment generates a measurement of the virtual machine image and provides it to a key service to request role keys that enable operation of the virtual machine image in the execution environment. The key service determines whether the virtual machine image is mapped to the role and, if so, returns the role keys to the requesting execution environment.

20 Claims, 6 Drawing Sheets

(56) References Cited

U.S. PATENT DOCUMENTS

2015/0244710 A1* 8/2015 Koster .................... G06F 21/53
713/171
2016/0134623 A1* 5/2016 Roth ..................... H04L 9/3268
713/156
2017/0279781 A1* 9/2017 Lie, Jr. .................. H04L 9/3234

OTHER PUBLICATIONS

"European Search Report Issued in European Patent Application No. 20181305.2", dated Jul. 23, 2020, 7 Pages.

* cited by examiner

SECURE SERVICE HOSTED IN A VIRTUAL SECURITY ENVIRONMENT

CROSS REFERENCE TO RELATED APPLICATION

The present application is a continuation of and claims priority of U.S. patent application Ser. No. 15/333,573, filed Oct. 25, 2016, the content of which is hereby incorporated by reference in its entirety.

BACKGROUND

Computer systems are currently in wide use. Some such computer systems are deployed in a remote server environment (such as in the cloud) where they host services.

The hosted services can be services where security is important. For instance, some hosted services may be payment services, credit card processing services, banking services, or a wide variety of other services that handle confidential information.

These types of systems have an infrastructure that is normally hosted on discrete systems. By way of example, each hosted service may be hosted on a separate or discrete physical machine. These machines may be deployed in physically caged environments to provide physical security. Also, developers or other programmers who write code for these types of systems are often made to enter a secured or caged physical facility with a relatively isolated network, again to increase security with respect to the developed code, that is deployed on such a service.

This can result in a number of drawbacks for such as service. By way of example, since each service is often deployed on a dedicated physical machine (or server) and there is no virtualization involved, scalability can be very difficult. In order to scale such a service, additional physical machines must be added for additional services or service instances. Further, because developers or programmers are required to generate code in a physically secure and strictly controlled environment, this can lead to rigidity in that it can be very difficult to make changes.

The discussion above is merely provided for general background information and is not intended to be used as an aid in determining the scope of the claimed subject matter.

SUMMARY

An execution environment has a deployed virtual machine image. The virtual machine image provides a service that is identified by a role. The execution environment generates a measure of the virtual machine image and provides it to a key service to request role keys that enable operation of the virtual machine image in the execution environment. The key service determines whether the virtual machine image is mapped to the role and, if so, returns the role keys to the requesting execution environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
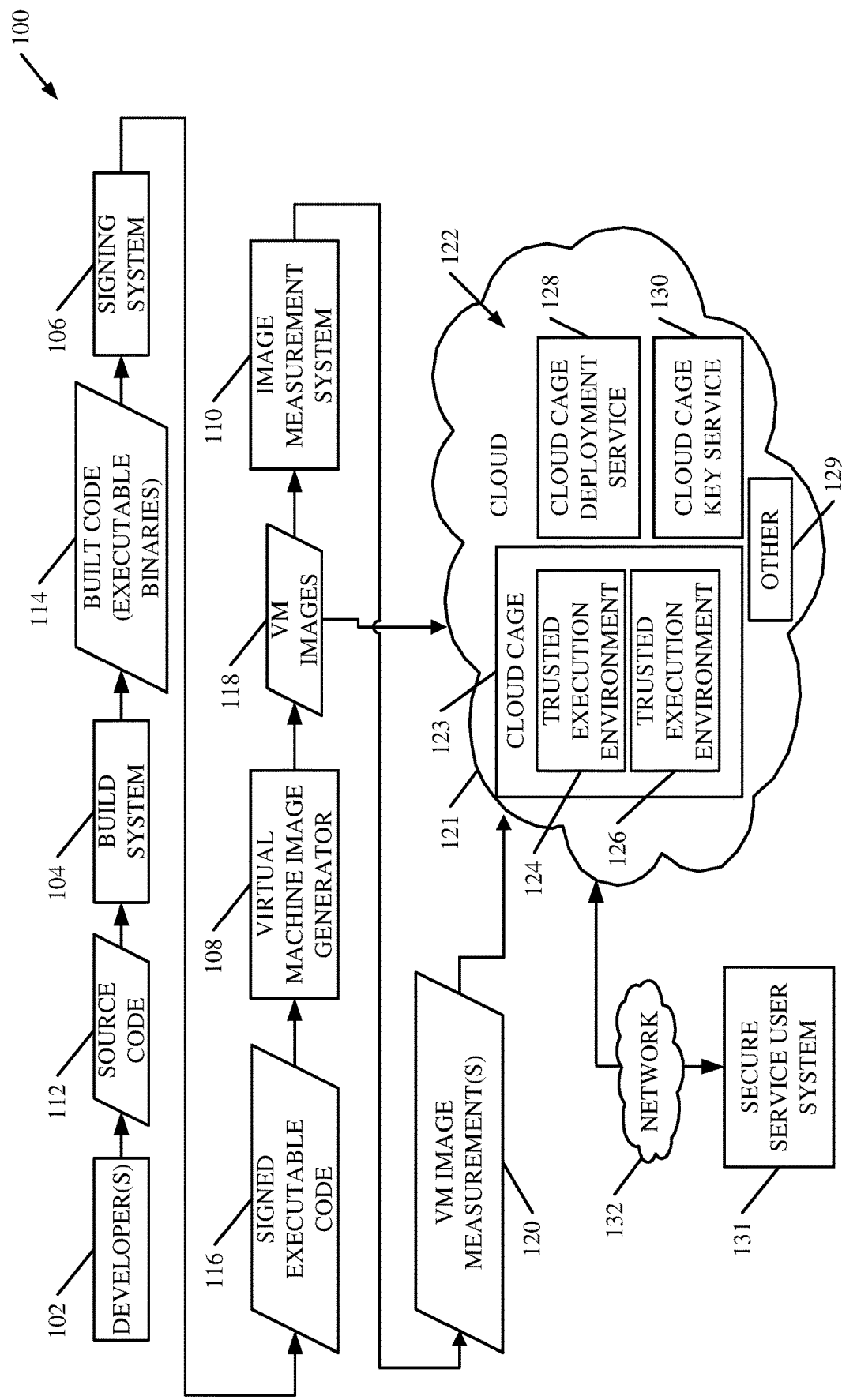
FIG. 1 is a flow diagram illustrating one example of a development channel for developing a service and generating a virtual machine image corresponding to the service.

FIG. 1 is a flow diagram illustrating one example of the operation of a development channel 100. Development channel 100 illustratively includes developers 102, build system 104, signing system 106, virtual machine image generator 108, and image measurement system 110. FIG. 1 also shows that the development channel 100 can be coupled to a cloud architecture 122 that includes a cloud cage 123 (which, itself, includes trusted execution environments 124 and 126), cloud cage deployment service 128 and cloud cage key service 130, and can include other items 129. FIG. 1 also shows that one or more secure service user systems 131 can access architecture 122 through network 132.

In the example illustrated in FIG. 1, developers 102 illustratively develop source code 112 which is code that is to be run in a hosted, secure service, such as in the trusted execution environments 124-126. Such a service may be a payment service, a banking service, a credit card processing service, or any of a wide variety of other services.

Build system 104 receives the source code 112 and builds the code into executable binaries (or other built code) 114. Code 114 is illustratively compiled, executable code that may include scripts and a variety of data files. It is illustratively provided to signing system 106. Singing system 106 illustratively signs code 114 to generate signed, executable code 116. Because code 116 is signed, this can ensure that it is not modified after the signature takes place. The signature may also indicate the code signer (or the identity of signing system 106).

Virtual machine image generator 108 then generates a virtual machine image by combining an appropriate operating system image and the signed executable code 116. The resultant virtual machine (VM) image 118 may include one or more services and databases that can be deployed to implement those services, in an execution environment. In one example, virtual machine image generator 108 can use a virtual hard drive format as a hard disk for a virtual machine. This can allow multiple operating systems to reside on a single machine. [ 0019] Image measurement system 110 then generates one or more virtual machine image measurements 120 based on virtual machine images 118. Measurements 120 illustratively include a re-computable, strong identity representing each image 118. In one example, each measurement 120 may be a cryptographic hash value that is computed over the corresponding VM image 118. The VM images 118 and their corresponding measurements 120 can then be provided to a cloud environment (or cloud architecture) 122 where they can be executed by virtual machines in one or more trusted execution environments 124-126.

The VM images 118 may be provided to cloud cage deployment service 128, along with a role-to-VM image mapping that maps the VM image 118 to the particular role corresponding to the service that it will execute. The VM measurements 120 can be provided to cloud cage key service 130, along with a measurement-to-role mapping that maps the particular measurement of the VM image 118 to the role as well. In addition, a particular trusted execution environment 124-126 that is being used to execute one of the VM images 118 may send cloud cage key service 130 a trusted execution environment identifier that identifies the particular trusted execution environment that will be deploying the VM image 118 represented by the VM image measurement 120.

Briefly, in operation, cloud cage deployment service 128 can deploy a particular VM image to a trusted execution environment 124-126. That environment 124-126 can then request role keys from cloud cage key service 130. Cloud cage key service 130 identifies whether the particular VM image is appropriate for the particular role, and requesting execution environment, and, if so, returns encrypted role keys back to the requesting execution environment so that it can operate to execute its service.

FIG. 1 also shows that once a service (such as a payment service or other secure service) is deployed into a trusted execution environment 124-126, a payment (or other secure service) user system 131 can access the service in one of the trusted execution environments through network 132 and cloud 121. By way of example, if the secure service is a credit card processing service, then user system 131 may be a system at a credit card company where the credit card processing is needed. If it is a banking service, then system 131 may be deployed at a bank. These are examples only.

Network 132 can be any of a wide variety of networks, such as a wide area network, a local area network, or any of a variety of other wired or wireless networks or combinations of networks. Some are listed below for the sake of example.

Figure 2:
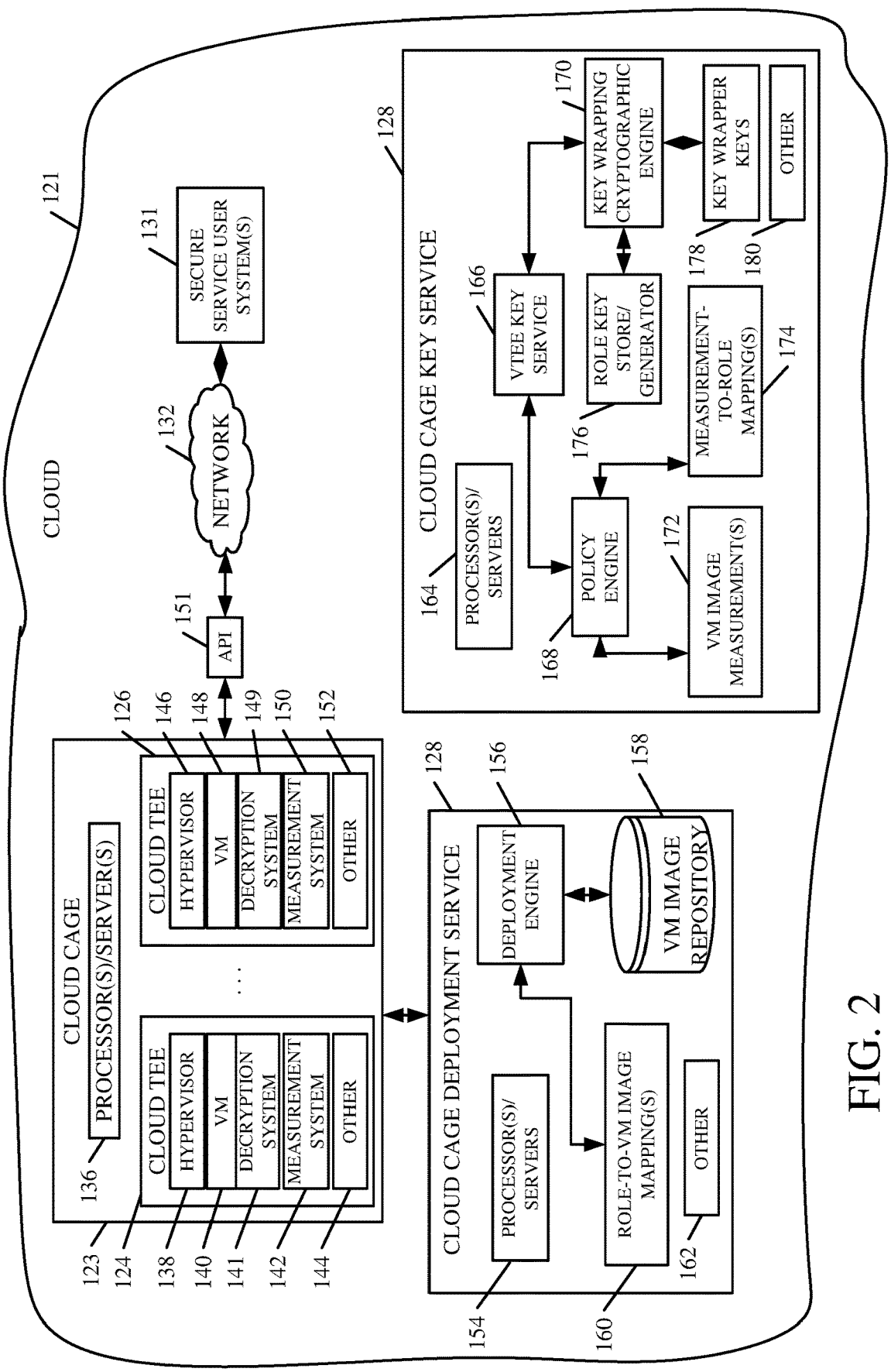
FIG. 2 is a block diagram of one example of a cloud cage architecture.

FIG. 2 is a block diagram showing one example of the cloud cage architecture 122, deployed in cloud 121, in more detail. Some of the items shown in FIG. 2 are similar to those shown in FIG. 1, and they are similarly numbered.

Before describing the overall operation of the architecture 122 illustrated in FIG. 2, a brief description of some of the items in FIG. 2, and their operation, will first be provided. In the example shown in FIG. 2, cloud cage 123 can include one or more processors or servers 136, trusted execution environments 124-126, and it can also include other items. Trusted execution environment 124 can include a hypervisor 138 and one or more virtual machines 140, along with a decryption system 141 and a measurement system 142. It can include other items 144 as well. Trusted execution environment 126 can also include a hypervisor 146, or the hypervisors 138 and 146 can be realized as a single hypervisor for generating virtual machines 140-148. Execution environment 126 can also include description system 149 and measurement system 150 and a variety of other items 152. The trusted execution environments 124-126 can be similar or different. For the sake of the present description, it will be assumed that they are similar and therefore only the operation of trusted execution environment 124 will be provided herein.

Virtual machine 140 illustratively receives a virtual machine image form cloud cage deployment service 128 (which is described in more detail below) and executes that image. Measurement system 142 can measure the image deployed on virtual machine 140. The measurement may be generated by applying a cryptographic hash function to the image. For instance, where the image is represented by a virtual hard disk image, the measurement may be generated by applying an SHA-256 hash to that image. This is only one example, and a variety of other ways for generating a measurement of the virtual machine image can be used as well. In executing the service represented by the VM-image, trusted execution environment 124 may expose an application programming interface (API) 151 that user system 131 can interact with to use the service.

In order to deploy a virtual machine image to a trusted execution environment 124, cloud cage deployment service 128 can be used. In one example, service 128 can include one or more processors or servers 154, deployment engine 156, virtual machine image repository 158, role-to-virtual machine image mappings 160, and it can include other items 162. A trusted execution environment 124 illustratively provides a role (which represents the service that it is to execute) to deployment engine 156. Deployment engine 156 then accesses role-to-VM image mappings 160 to identify a particular VM image corresponding to that role and obtains that image from VM image repository 158. It then deploys that VM image on the virtual machine 140 in the requesting trusted execution environment 124. This is described in greater detail below with respect to FIG. 3.

Once the VM image is deployed on the virtual machine 140, the trusted execution environment 124 illustratively still needs the role keys that it will use in order to execute the particular service (or role) that has been deployed. That is, the deployed virtual machine image may include code that represents one or more services and databases, but it does not yet have the keys it needs to execute its operations. Therefore, trusted execution environment 124 generates a measurement of the VM image deployed on virtual machine 140 and provides that, along with the role (corresponding to the service) to cloud cage key service 130 in order to obtain the role keys it needs to operate.

Cloud cage key service 130 can include one or more processors or servers 164, virtual trusted execution environment (VTEE) key service 166, policy engine 168, key wrapping cryptographic engine 170, VM image measurement store 172, measurement-to-role mappings 174, role key store/generator 176, key wrapper keys 178, and it can include a variety of other items 180 as well. VTEE key service 166 provides the request (the virtual machine image measurement and the corresponding role and an identity of the requesting trusted execution environment 124) to policy engine 168. Policy engine 168 accesses VM image measurements 172 to verify that the requesting trusted execution environment is an appropriate environment for executing the particular role represented by the VM image. Engine 168 also accesses measurement-to-role mappings 174 to identify whether the VM image measurement provided by the trusted execution environment 124 is mapped to the role identified by the trusted execution environment 124, in its request for keys. If policy engine 168 evaluates positively, this indicates that the trusted execution environment that is requesting the keys is an appropriate environment for executing the identified role. It also indicates that the measurement of the code (e.g., operating system, code, databases, etc.) in the VM image deployed in trusted execution environment 124 maps to the role that was identified by the trusted execution environment 124. Therefore, this indicates that the trusted execution environment 124 is appropriate, and that the code has not been changed and maps to the identified role.

In that case, VTEE key service 166 requests that key wrapping cryptographic engine obtain the role keys for the identified role from role key store/generator 176 and wrap those keys, or encrypt them, with one or more key wrapper keys 178. The wrapped keys are then provided back to VTEE key service 166, which returns them to the requesting trusted execution environment 124. There, they can be decrypted by decryption system 141 and used to execute the service (or role) in that environment.

Figure 3:
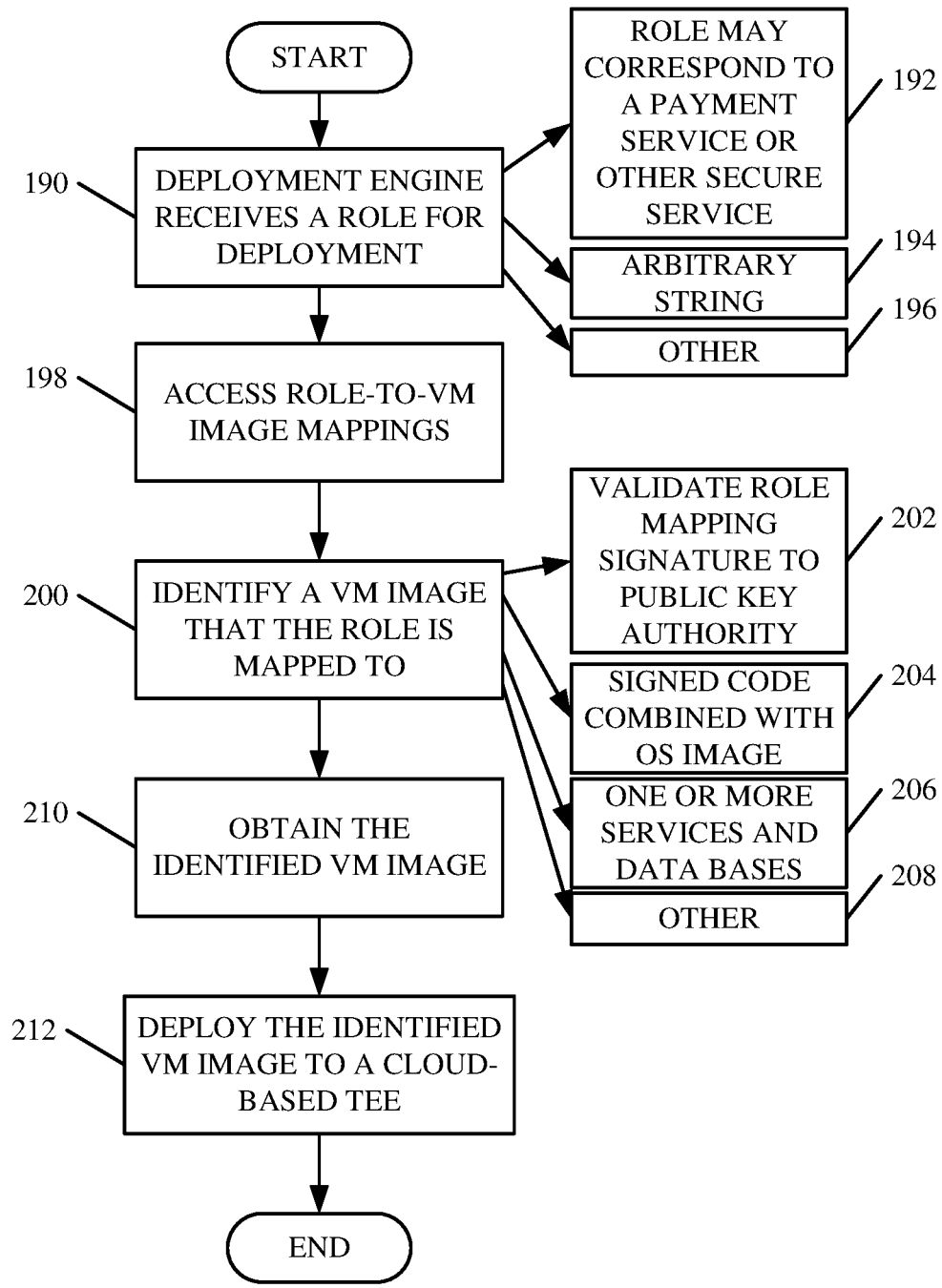
FIG. 3 is a flow diagram illustrating one example of the operation of a deployment service.

FIG. 3 is a flow diagram illustrating one example of the operation of cloud cage deployment service 128, in more detail. Deployment engine 156 first receives a role identifier identifying a role that is to be deployed into a trusted execution environment 124. This is indicated by block 190 in FIG. 3. The role illustratively corresponds to a secure service, such as a payment service, a credit card service, etc., that is to be hosted by the trusted execution environment 124. This is indicated by block 192. The role identifier may be an arbitrary string 194, or other representation 196.

Deployment engine 156 then accesses the role-to-VM image mappings 160 to identify a particular VM image that corresponds to the role. Accessing the role-to-VM image mappings is indicated by block 198, and identifying a VM image that the role is mapped to, based upon those mappings, is indicated by block 200. In one example, the mappings are represented as set out in Equation 1 below where "image" is represented in a virtual image format and "H" is a cryptographic hash function.

$$\varnothing: \text{Role} \rightarrow H(\text{IMAGE}) \qquad \text{Eq. 1}$$

The role mapping $\Phi$ may be signed with a role mapping signature key $K_\Phi$, and deployment engine 156 may validate the signature to a public key certificate authority installed on the deployment machine in trusted execution environment 124 (e.g., installed on VM 140). Validating the role mapping signature is indicated by block 202. Again, the VM image may be the signed code combined with an image of an appropriate operating system as indicated by block 204. The VM image can represent one or more services and databases as indicated by block 206, and the VM image may be identified in other ways as well, as indicated by block 208.

Deployment engine 156 then obtains the identified VM image from VM image repository 158. This is indicated by block 210. It then deploys the identified VM image to the cloud-based trusted execution environment 124. This is indicated by block 212.

Figure 4:
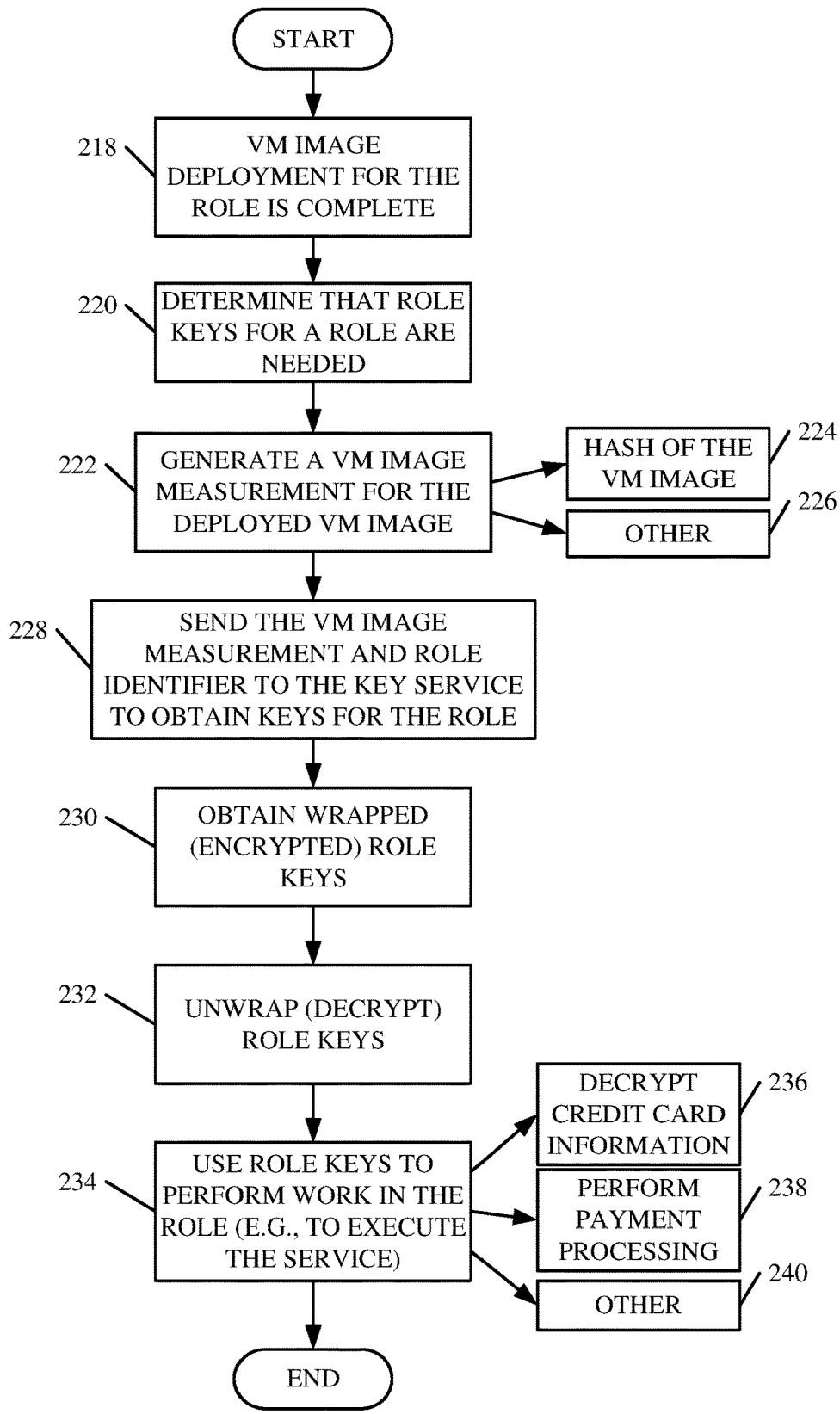
FIG. 4 is a flow diagram illustrating one example of the operation of an execution environment.

FIG. 4 is a flow diagram illustrating one example of the operation of trusted execution environment 124 in requesting role keys from cloud cage key service 130, and receiving those keys, and using them to perform its work. It is first assumed that a VM image representing the service to be executed in environment 124 has been deployed by deployment service 128 in trusted execution environment 124. This is indicated by block 218. Trusted execution environment 124 then determines that role keys, for the role which represents the service it is to execute, are needed to perform operations. This is indicated by block 220 in the flow diagram of FIG. 4.

Measurement system 142 then generates a VM image measurement for the deployed VM image, deployed on virtual machine 140. This is indicated by block 222. Again, as briefly described above, the VM image measurement may be obtained by applying a hash function to the VM image. This is indicated by block 224. It can be obtained in other ways as well, as indicated by block 226.

Trusted execution environment 124 then sends the VM image measurement and a role identifier identifying the role, to cloud cage key service 130 to obtain the role keys for the role, so that trusted execution environment 124 can execute its operations. This is indicated by block 228.

Cloud cage key service 130 then operates to verify that the role is appropriate to the requesting trusted execution environment and that the keys are appropriate to the role. If so, service 130 returns wrapped (or encrypted) role keys to the requesting trusted execution environment 124 in cloud cage 123. The operation of cloud cage key service 130 is described in greater detail below with respect FIG. 5, and obtaining the wrapped or encrypted role keys at trusted execution environment 124 is indicated by block 230 in the flow diagram of FIG. 4.

Decryption system 141 in trusted execution environment 124 then unwraps (or decrypts) the received role keys and uses them to perform work in the role (or the service) that it is executing. This is indicated by blocks 232 and 234 in the flow diagram of FIG. 3. The particular work to be performed in the trusted execution environment will vary widely, depending on the particular service that it is hosting or executing. For instance, the role keys may be used to decrypt credit card information as indicated by block 236. They may be used to perform payment processing as indicated by block 238. They may of course be used in a wide variety of other ways as well, and this is indicated by block 240.

Figure 5:
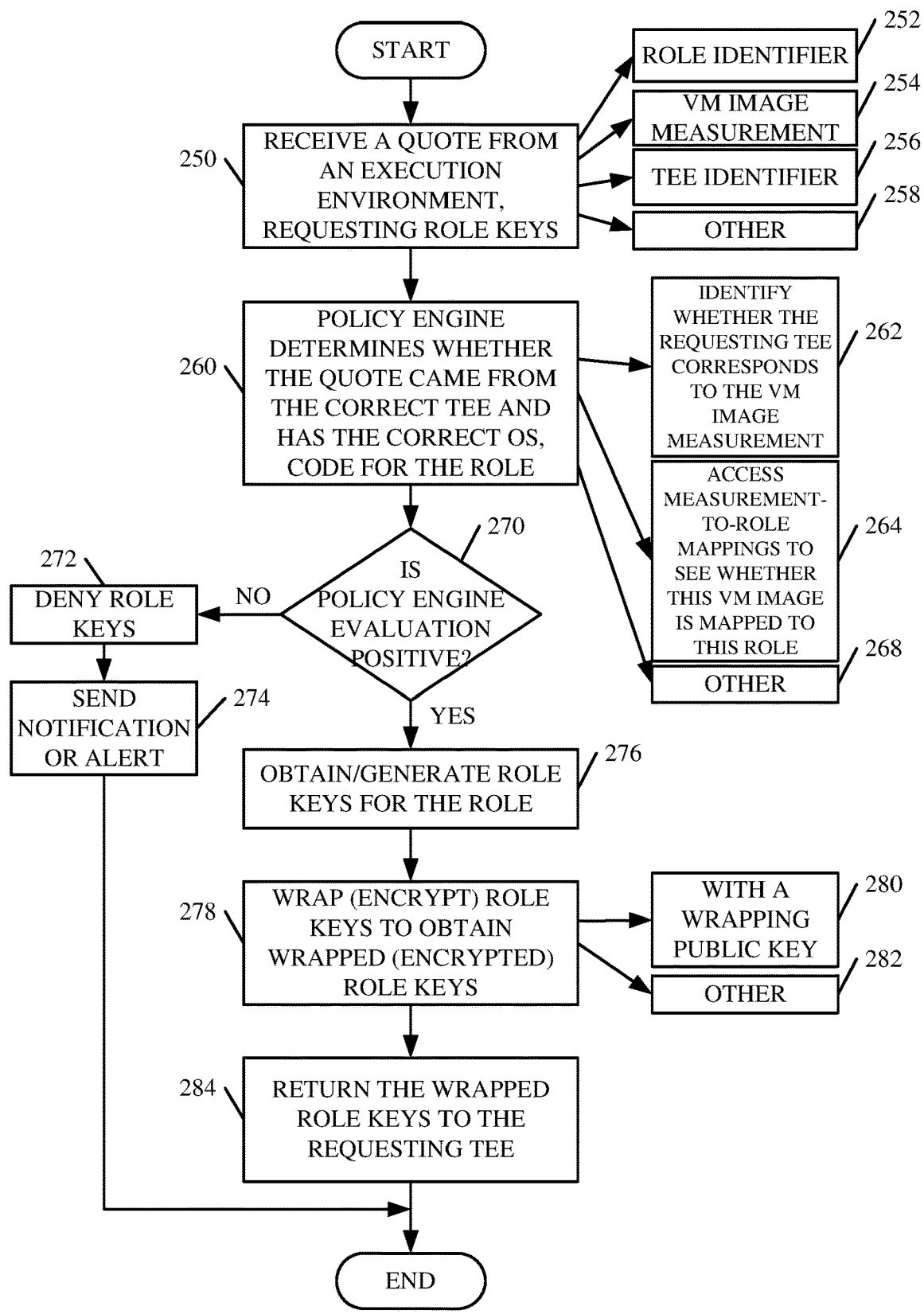
FIG. 5 is a flow diagram illustrating one example of the operation of a key service in providing requested role keys to an execution environment.

FIG. 5 is a flow diagram illustrating one example of the operation of cloud cage key service 130 in more detail. VTEE key service 166 first receives a quote from an execution environment (such as trusted execution environment 124) requesting role keys. This is indicated by block 250 in the flow diagram of FIG. 5. As briefly discussed above, the quote may include role identifier 252 that identifies the particular role be executed by the requesting execution environment. It also illustratively includes a VM measurement generated by that environment. This is indicated by block 254. It can include a trusted execution environment identifier 256 that identifies the particular trusted execution environment that is making the request. The request can include other items 258 as well.

The request is then provided to policy engine 168, where it is evaluated to determine whether the quote (or request) came from an appropriate trusted execution environment and whether it has the correct operating system, code, etc., for the identified role. This is indicated by block 260 in the flow diagram of FIG. 5. In one example, policy engine 168 accesses the VM image measurement store 172 to identify whether the requesting trusted execution environment corresponds to the VM image measurement that was received in the request. For instance, it can determine whether that VM image has properly been deployed on an appropriate trusted execution environment. This is indicated by block 262.

Policy engine 168 can also access measurement-to-role mappings 174 to determine whether the VM image deployed on the requesting trusted execution environment (and represented by the VM image measurement) is mapped to the identified role. This is indicated by block 264. Thus, given the VM image measurement, the policy engine 168 produces a set of roles by accessing mappings 174 which map a VM image to a set of roles as follows:

$$\theta: h \rightarrow S_R$$

$$S_R = \{\text{Role} | \varnothing(\text{Role}) = h\}$$

Where $$h = H(\text{IMAGE}) \qquad \text{Eq. 2}$$

From Equation 2 above, it can be seen that the mapping $\Theta$ maps an image h (which equals H(Image) as set out in Equation 1 above) to a set of roles $S_R$. The set of roles $S_R$ are those roles that are mapped to the VM image measurement by the mapping Φ. The set of roles is made up of a role given its mapping to the image measurement h.

If policy engine 168 either determines that the requesting trusted execution environment is not an appropriate environment to run the VM image identified by the VM image measurement, or if it determines that the VM image measurement does not map to the role of the requesting trusted execution environment, then VTEE key service 166 determines that policy engine 168 has not evaluated the quote positively. This is indicated by block 270 in FIG. 5. Thus, VTEE key service 166 denies the request for role keys as indicated by block 272. It can send a notification or alert or other message or perform other operations in response to that negative evaluation. This is indicated by block 274.

However, assuming that policy engine 168 determines that the requesting trusted execution environment 124 is an appropriate environment to execute the role, and assuming that the VM image measurement provided by the requesting trusted execution environment maps to the identified role, then VTEE key service 166 determines at block 270 that the policy engine evaluation is positive, or favorable. In that case, VTEE key service 166 interacts with key wrapping cryptographic engine to obtain the role keys so that it can provide them to the requesting trusted execution environment 124.

To do so, VTEE key service 166 provides the role identifier to key wrapping cryptographic engine 170. Engine 170 accesses role key store/generator 176 to obtain or generate the role keys for the identified role. This is indicated by block 276 in the flow diagram of FIG. 5. Engine 170 then accesses key wrapper keys 178 and wraps (or encrypts) the set of role keys with one or more key wrapper keys 178. This is indicated by block 278 in the flow diagram of FIG. 5. The role keys can be wrapped individually or as a set. The key wrapper keys can be public keys as indicated by block 280, and wrapping the role keys can be performed in other ways as well, and this is indicated by block 282.

The role keys can be arbitrary cryptographic key types, and the wrapping keys are illustratively public keys for that particular role. In obtaining the wrapper keys, engine 170 can access a map Ψ that maps a given role to a wrapping public key $Pu_r$, as set out in Equation 3 below:

$$\Psi: \text{Role} \rightarrow P_{U_R} \qquad \text{Eq. 3}$$

$S_{k_r}$ is a set of wrapped role keys $$E_{P_{U_R}}(K_R)$$

encrypted with the role key wrapping public key $Pu_R$ as follows:

$$S_{K_R} = \{E_{P_{U_R}}(K_R) \mid \Psi(\text{Role}) = K_{Pu_R}\} \qquad \text{Eq. 4}$$

Once key wrapping cryptographic engine 170 obtains the role keys and wraps them with the appropriate key wrapper keys 178, it returns the wrapped role keys to VTEE key service 166, which returns them to the requesting trusted execution environment 124. This is indicated by block 284 in the flow diagram of FIG. 5.

It will thus be appreciated that the cloud cage treats multiple payment services as roles, and maps those roles to VM images as defined above. Some examples of roles or services running in the cloud cage trusted execution environment can be a virtual hardware security module (or cryptography service), a money transfer agent service, a money transfer agent database, among many others.

In the architectures described above, in one example, each piece of server hardware illustratively has a high assurance cryptographic processor, a relatively small amount of key storage, a key pair, and the ability to measure the binary image loaded by the trusted hardware in cloud cage deployment service 128. The high assurance cryptographic processor may have a public key with a verifiable certificate. It may also include attestation capability in the hardware for keys generated by that hardware. This binds the key integrity to the particular key certificate. In addition, as discussed above, the role-to-VM image mapping can be signed. The signature key secrecy and its public key integrity can be verified by a separate system, or those systems can be part of the cloud cage architecture. The role keys and the wrapping keys rely on the mappings Φ and Ψ discussed above. The role definition code and data can be signed and verified up to a certificate authority, which may be an external authority.

It can thus be seen that the present system ensures security, even without physical cage security around the development and deployment resources. It ensures that the virtual machine image deployed on a trusted execution environment has not been changed. It also ensures that, prior to obtaining role keys, the virtual machine image is the appropriate virtual machine image to obtain those keys, and that the trusted execution environment is the appropriate environment to run that virtual machine image. The role keys are wrapped or encrypted when they are returned to the trusted execution environment, so that it can execute its operation.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Architecture 122 is described herein as a cloud computing architecture. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 122 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

Figure 6:
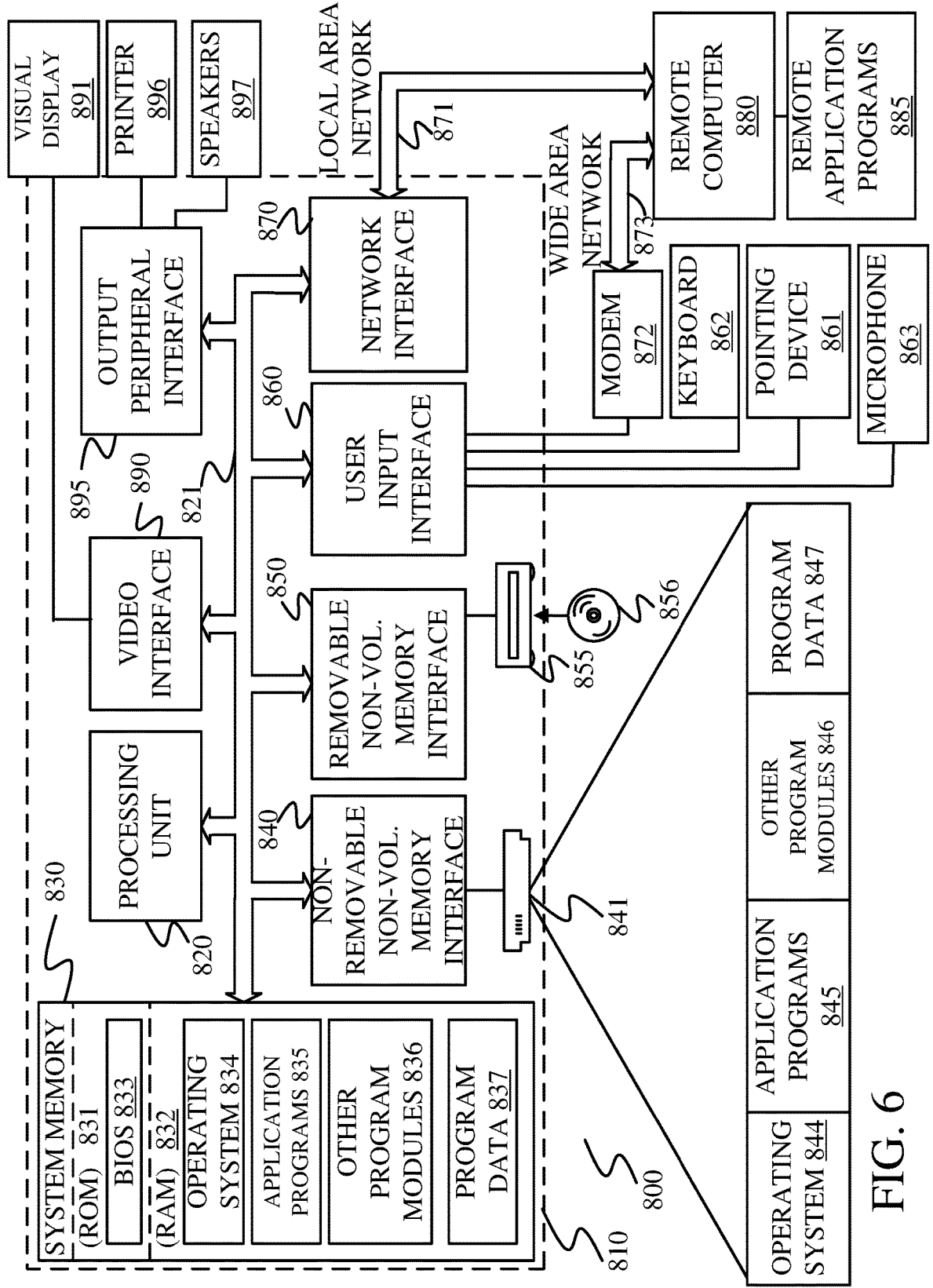
FIG. 6 is a block diagram showing one example of a computing environment that can be used in the architecture illustrated in FIG. 1.

FIG. 6 is one example of a computing environment in which architecture 100, or parts of it, (for example) can be deployed. With reference to FIG. 6, an example system for implementing some embodiments includes a general-purpose computing device in the form of a computer 810. Components of computer 810 may include, but are not limited to, a processing unit 820 (which can comprise processors or servers 136, 154 or 164), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 6.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 6 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 6 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 6 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

Example 1 is a computing system, comprising:

a policy engine that receives a role, identifying a service, and a virtual machine (VM) image measurement, indicative of a virtual machine image deployed in an execution environment, and determines whether the VM image measurement is mapped to the role, and generates an evaluation signal indicative of the determination;

a key wrapping cryptographic engine that, based on the evaluation signal indicating that the VM image measurement is mapped to the role, obtains and wraps a set of role keys, the role keys corresponding to the role and enabling the execution environment to execute the service; and a key service that provides the execution environment with the set of wrapped role keys.

Example 2 is the computing system of any or all previous examples wherein the policy engine is configured to receive the role, the VM image measurement and an execution environment identifier from a requesting execution environment, the execution environment identifier identifying the requesting execution environment.

Example 3 is the computing system of any or all previous examples wherein the policy engine is configured to determine whether the requesting execution environment is mapped to the VM image measurement based on the execution environment identifier and to generate the evaluation signal based on the determination.

Example 4 is the computing system of any or all previous examples and further comprising:

a set of measurement-to-role mappings that map each of a plurality of different sets of roles to a different VM image measurement, the policy engine determining whether the VM image measurement is mapped to the role by accessing the measurement-to-role mappings.

Example 5 is the computing system of any or all previous examples and further comprising:

a role key store/generator configured to provide the set of role keys to the key wrapping cryptographic engine; and a set of key wrapper keys, each key wrapper key being mapped to a given role, the key wrapping cryptographic engine identifying one or more key wrapper keys mapped to the role and encrypting the role keys with the identified one or more key wrapper keys.

Example 6 is the computing system of any or all previous examples and further comprising:

a deployment engine configured to receive the role and obtain the VM image, based on the role, and deploy the VM image to the execution environment.

Example 7 is the computing system of any or all previous examples and further comprising:

a set of role-to-image mappings that map the role to the VM image, the deployment engine accessing the set of role-to-image mappings to identify the VM image.

Example 8 is the computing system of any or all previous examples and further comprising:

a VM image repository that stores the VM image, the deployment engine obtaining the VM image, for deployment, from the VM image repository.

Example 9 is the computing system of any or all previous examples wherein the execution environment comprises:

a measurement system configured to generate the VM image measurement and provide the VM image measurement to the key service.

Example 10 is the computing system of any or all previous examples wherein the measurement system executes a hash function over the VM image to obtain a hash value which comprises the VM image measurement.

Example 11 is a computer-implemented method, comprising:

Identifying, at a key service, an execution environment service, and a virtual machine (VM) image measurement, indicative of a virtual machine image deployed in an execution environment;

determining whether the VM image measurement is mapped to the execution environment service;

generating an evaluation signal indicative of the determination;

obtaining, in response to the evaluation signal indicating that the VM image measurement is mapped to the execution environment service, a set of role keys, the role keys corresponding to the execution environment service and enabling the execution environment to execute the execution environment service;

encrypting the role keys in the set of role keys; and providing the execution environment with the set of encrypted role keys.

Example 12 is the computer-implemented method of any or all previous examples and further comprising:

receive a role that identifies the execution environment service;

receiving the VM image measurement; and receiving an execution environment identifier from a requesting execution environment, the execution environment identifier identifying the requesting execution environment, and wherein determining whether the VM image measurement is mapped top the execution environment service comprises determining whether the requesting execution environment is mapped to the VM image measurement based on the execution environment identifier and generating the evaluation signal comprises generating the evaluation signal based on the determination.

Example 13 is the computer-implemented method of any or all previous examples wherein determining whether the VM image measurement is mapped to the execution environment service comprises:

determining whether the VM image measurement is mapped to the role by accessing asset of measurement-to-role mappings that map each of a plurality of different sets of roles to a different VM image measurement.

Example 14 is the computer-implemented method of any or all previous examples wherein encrypting the role keys comprises:

identifying one or more key wrapper keys mapped to the role; and encrypting the role keys with the identified one or more key wrapper keys.

Example 15 is the computer-implemented method of any or all previous examples and further comprising:

receiving the role at a deployment system;

obtaining the VM image, based on the role, at the deployment system by accessing a set of role-to-image mappings that map the role to the VM image; and deploying the VM image to the execution environment.

Example 16 is the computer-implemented method of any or all previous examples and further comprising:

generating the VM image measurement with a measurement system in the execution environment; and providing the VM image measurement to the key service.

Example 17 is the computer-implemented method of any or all previous examples wherein generating the VM image measurement comprises:

executing, with the measurement system, a hash function over the VM image to obtain a hash value which comprises the VM image measurement.

Example 18 is a computing system, comprising:

an execution environment that executes a service represented by a deployed virtual machine (VM) image, and identified by a role;

a measurement system configured to apply a hash function to the VM image to generate a VM image measurement and provide the VM image measurement to a key service, the execution environment providing the role and the VM image measurement to a key service to request a set of role keys; and a decryption system that receives a set of wrapped role keys from the key service and decrypts the set of wrapped role keys to obtain the requested set of role keys, the execution environment executing the service using the requested role keys.

Example 19 is the computing system of any or all previous examples wherein the key service comprises:

a policy engine that receives the role from the execution environment, identifying the service, and the VM image measurement, indicative of the virtual machine image deployed in the execution environment, and determines whether the VM image measurement is mapped to the role, and generates an evaluation signal indicative of the determination; and a key wrapping cryptographic engine that, based on the evaluation signal indicating that the VM image measurement is mapped to the role, obtains and wraps the set of role keys, the key service providing the execution environment with the set of wrapped role keys.

Example 20 is the computing system of any or all previous examples and further comprising:

a deployment system that includes a set of role-to-image mappings that map the role to the VM image, and a VM image repository that stores the VM image, and the deployment engine configured to obtain the VM image, for deployment, from the VM image repository, by accessing the role-to-image mappings based on the role, and configured to deploy the VM image to the execution environment.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by a computing system, the method comprising:

receiving a request to deploy a computing service in an execution environment of the computing system;

prior to execution of at least a portion of the computing service in the execution environment, applying, in the execution environment, a measurement function to a virtual machine (VM) image, that defines the computing service, deployed in the execution environment, generating, by the computing system, a VM image measurement based on the application of the measurement function;

sending, by the computing system to a key service, a key request including an indication of the computing service and the VM image measurement, and obtaining, from the key service in response to the key request, a key representing a determination that the VM image measurement is mapped to the computing service, wherein the key enables the execution environment to execute the portion of the computing service; and executing the portion of the computing service in the execution environment using the key.

2. The method of claim 1, wherein the measurement function comprises a hash function.

3. The method of claim 1, wherein the computing service is identified by a role, and further comprising sending an indication of the role to the key service.

4. The method of claim 3, wherein obtaining the key comprises receiving, from the key service, a role key that is associated with the role.

5. The method of claim 1, wherein the execution environment comprises a trusted execution environment.

6. The method of claim 4, wherein the role key comprises an encrypted role key.

7. The method of claim 6, and further comprising decrypting the encrypted role key to obtain the key.

8. The method of claim 3, and further comprising:
deploying the computing service to the execution environment using VM image.

9. The method of claim 8, and further comprising:
obtaining the VM image from a deployment system.

10. The method of claim 9, wherein the deployment system accesses a role-to-image mapping that maps the role to the VM image.

11. A computing system comprising:
at least one processor; and
memory storing instructions executable by the at least one processor, wherein the instructions, when executed, cause the computing system to:
receive a request to deploy a computing service in an execution environment of the computing system;
prior to execution of at least a portion of the computing service in the execution environment,
apply, in the execution environment, a measurement function to a virtual machine (VM) image, that defines the computing service, deployed in the execution environment,
generate, by the computing system, a VM image measurement based on the application of the measurement function,
send, by the computing system, to a key service, a key request including an indication of the computing service and the VM image measurement, and
receive, from the key service in response to the key request, a key representing a determination that the VM image measurement is mapped to the computing service, wherein the key enables the execution environment to execute the portion of the computing service; and
execute the portion of the computing service in the execution environment using the key.

12. The computing system of claim 11, wherein the measurement function comprises a hash function.

13. The computing system of claim 11, wherein the computing service is identified by a role, and wherein the instructions, when executed, cause the computing system to send an indication of the role to the key service.

14. The computing system of claim 13, wherein the instructions cause the computing system to receive, from the key service, a role key that is associated with the role.

15. The computing system of claim 14, wherein the role key is received from the key service based on a determination that the VM image measurement is mapped to the role.

16. The computing system of claim 14, wherein the role key comprises an encrypted role key, and the instructions cause the computing system to:
decrypt the encrypted role key to obtain the key.

17. The computing system of claim 14, wherein the instructions, when executed, cause the computing system to:
obtain the VM image from a deployment system; and
deploy the computing service to the execution environment using VM image.

18. The computing system of claim 17, wherein the deployment system accesses a set of role-to-image mappings that map the role to the VM image, and the role key is received from the key service based on a determination that the VM image measurement is mapped to the role.

19. A computing system comprising:
at least one processor; and
memory storing instructions executable by the at least one processor, wherein the instructions, when executed, provide:
a measurement system configured to:
prior to execution of at least a portion of a computing service in an execution environment,
apply, in the execution environment, a measurement function to a virtual machine (VM) image, that defines the computing service, deployed in the execution environment;
obtain a virtual machine (VM) image measurement based on the application of the measurement function to the VM image; and
send a key request to a key service, the key request including an indication of the computing service and the VM image measurement; and
an execution environment configured to:
receive a role key from the key service based on a determination that the VM image measurement is mapped to a role corresponding to the computing service, wherein the role key enables the execution environment to execute of at least a portion of the computing service, and
execute the portion of the computing service in the execution environment using the role key.

20. The computing system of claim 19, wherein
the measurement function comprises a hash function, and the instructions, when executed, provide:
a decryption system that receives, from the key service, an encrypted role key that is associated with the role, and decrypts the encrypted role key to obtain the key.

* * * * *